US012598388B2

(12) United States Patent (10) Patent No.: US 12,598,388 B2
Takao et al. (45) Date of Patent: Apr. 7, 2026

(54) IMAGE CAPTURING APPARATUS AND CONTROL METHOD THEREOF

(71) Applicant: CANON KABUSHIKI KAISHA, Tokyo (JP)

(72) Inventors: Yumi Takao, Chiba (JP); Masato Nakata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 18/599,369

(22) Filed: Mar. 8, 2024

(65) Prior Publication Data

US 2024/0323530 A1 Sep. 26, 2024

(30) Foreign Application Priority Data

Mar. 20, 2023 (JP) .................................. 2023-044724

(51) Int. Cl.
| | |
|---|---|
| *H04N 23/68* | (2023.01) |
| *G02B 7/36* | (2021.01) |
| *H04N 23/67* | (2023.01) |
| *H04N 25/704* | (2023.01) |

(52) U.S. Cl.
CPC ........... *H04N 23/687* (2023.01); *G02B 7/365* (2013.01); *H04N 23/672* (2023.01); *H04N 25/704* (2023.01)

(58) Field of Classification Search
CPC .................................................... H04N 23/687
See application file for complete search history.

(56) References Cited

U.S. PATENT DOCUMENTS

| | | | | |
|---|---|---|---|---|
| 9,325,885 | B2 * | 4/2016 | Takeuchi | H04N 23/6812 |
| 2016/0006937 | A1 * | 1/2016 | Yamamoto | H04N 23/54 |
| | | | | 348/208.11 |
| 2017/0064189 | A1 * | 3/2017 | Chikano | H04N 23/672 |
| 2021/0136295 | A1 * | 5/2021 | Saito | H04N 23/55 |
| 2021/0144291 | A1 * | 5/2021 | Akamatsu | H04N 23/67 |

FOREIGN PATENT DOCUMENTS

JP 2021071573 A 5/2021

* cited by examiner

*Primary Examiner* — Cynthia Segura

(74) *Attorney, Agent, or Firm* — Cowan, Liebowitz & Latman, P.C.

(57) ABSTRACT

An image capturing apparatus comprises: an image sensor with a plurality of pixels including focus detection pixels that output signals so as to be able to acquire a pair of focus detection signals having parallax based on light fluxes that have passed through mutually different pupil regions of an imaging optical system; a movement control unit that moves incident positions of the light fluxes on the image sensor; and a focus detection unit that performs phase difference focus detection using the pair of focus detection signals. The movement control unit moves the incident positions in a phase difference detection direction a plurality of cycles during an exposure period for acquiring the pair of focus detection signals, and the plurality of cycles of movement includes movement with a first amplitude and movement with a second amplitude different from the first amplitude.

16 Claims, 10 Drawing Sheets

F I G. 1B
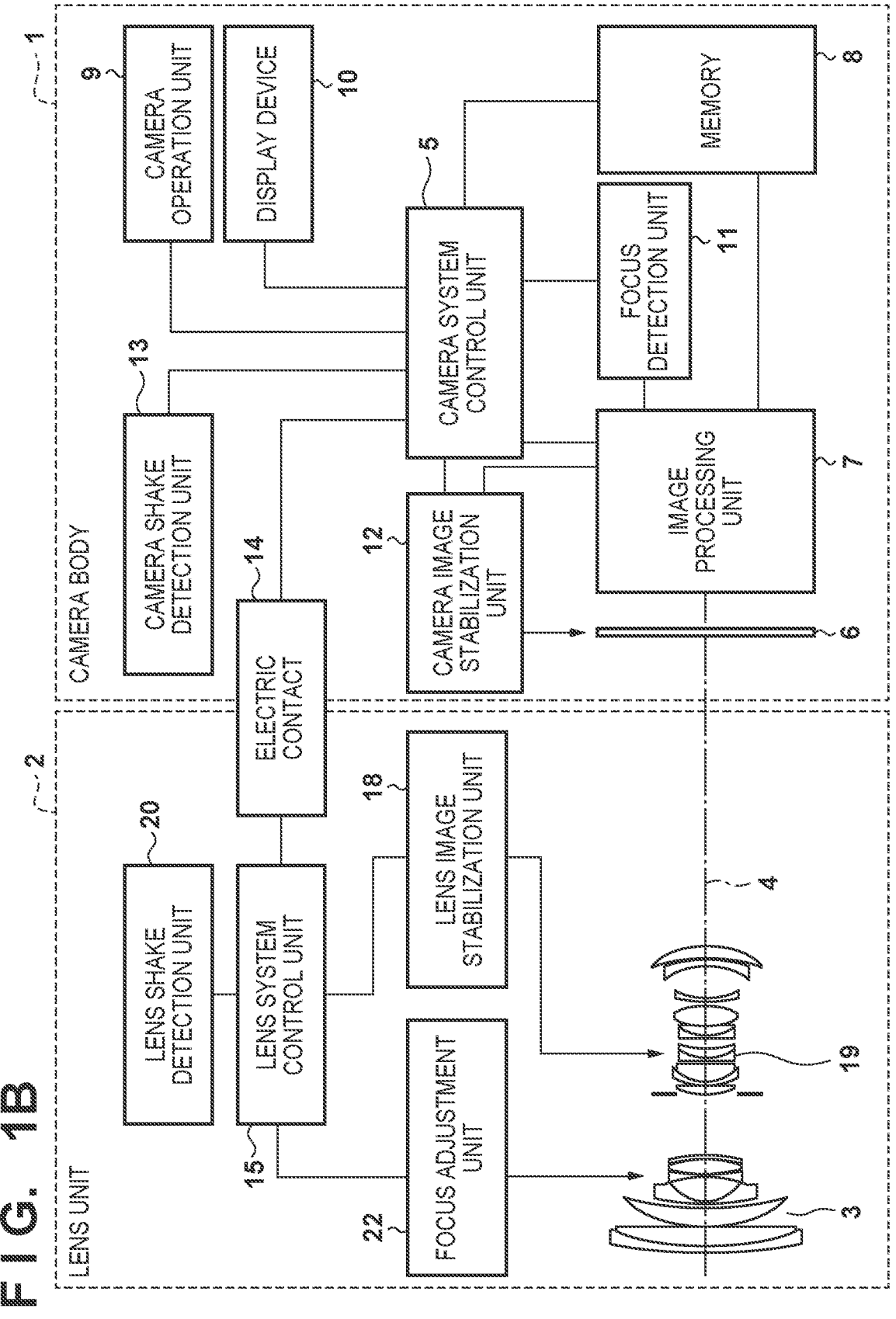

F I G. 3A
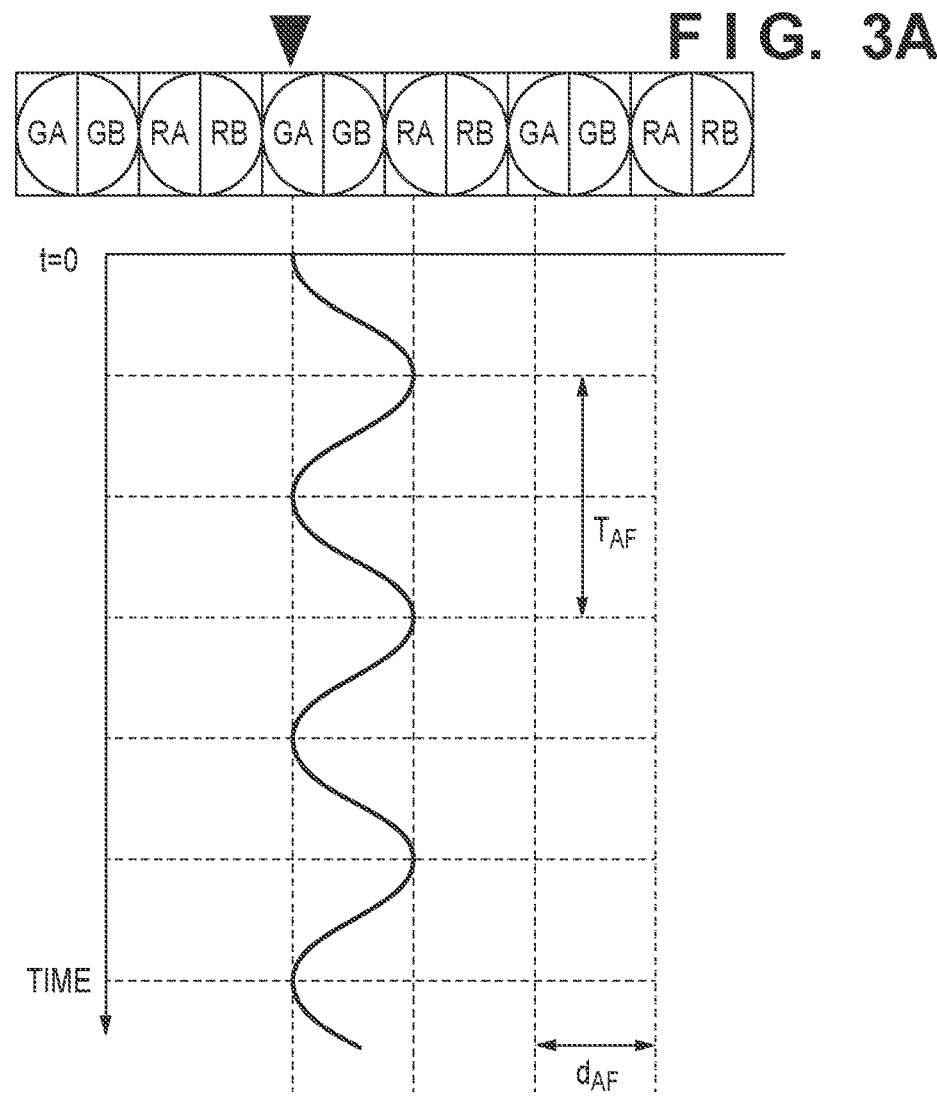
F I G. 3B
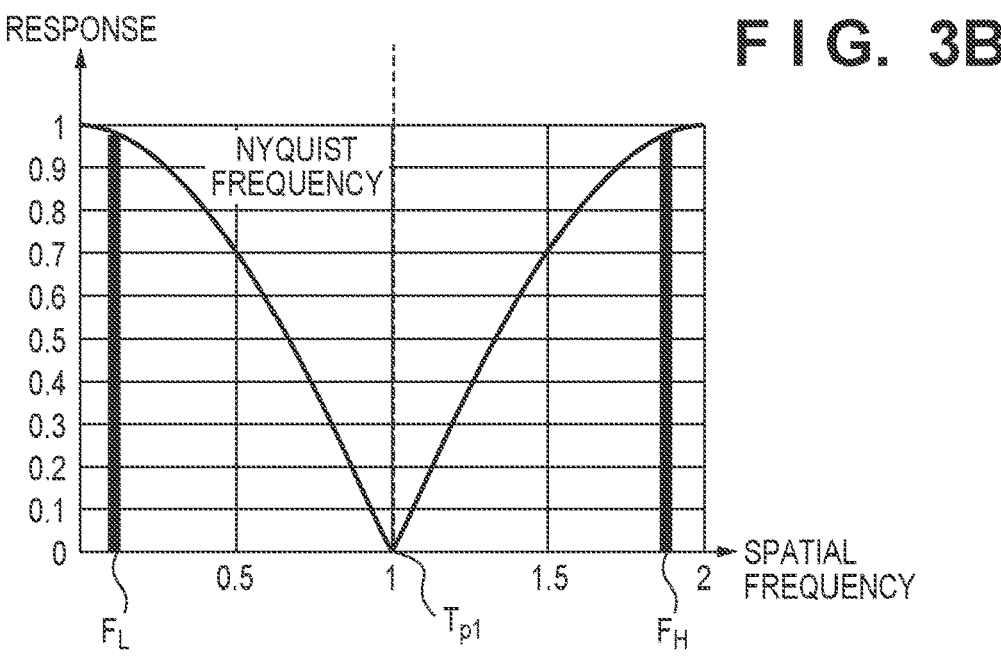

F I G. 6A
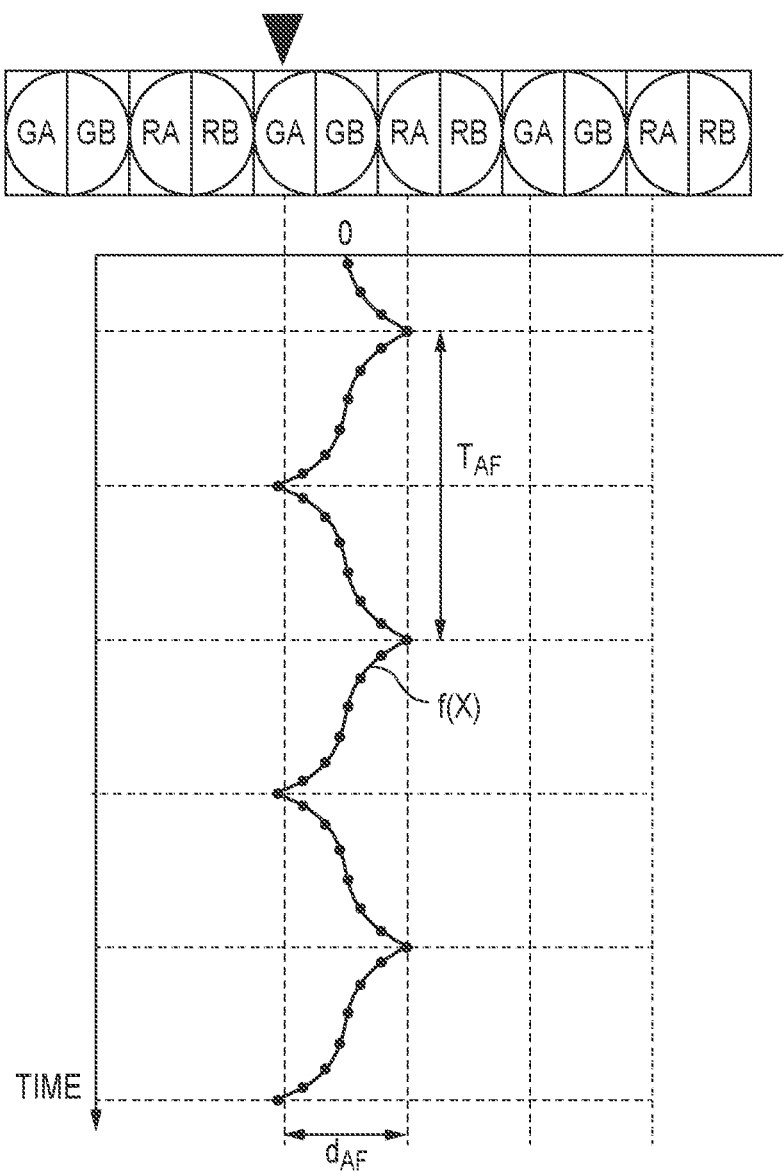
F I G. 6B
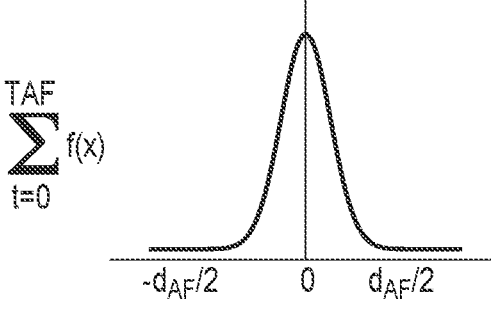
POSITION x

IMAGE CAPTURING APPARATUS AND CONTROL METHOD THEREOF

BACKGROUND OF THE INVENTION

Field of the Invention

The present invention relates to an image capturing apparatus and a control method thereof and, more specifically to, a technique for a vibration-type low-pass filter used in an image capturing apparatus.

Description of the Related Art

Conventionally, there is known a technique for alleviating spatial aliasing by arranging an optical low-pass filter on an incident surface side of an image sensor such as a CCD and a CMOS sensor.

FIG. 9 is a diagram schematically showing a spatial frequency of an image generally acquired by an image sensor and its response characteristics in a case where no optical low-pass filter is arranged. In FIG. 9, the horizontal axis represents the spatial frequency (the Nyquist frequency is 1), and the vertical axis represents its response. A solid line 901 indicates the response characteristics of the image sensor with respect to the image obtained by the image sensor. Since the response characteristic shown here also includes the MTF characteristics as optical characteristics of the imaging optical system for forming an image with light from the subject on the image sensor, the response characteristics gradually decrease toward 1 which is the sampling frequency. The MTF characteristics change depending on various optical conditions such as the focal state of the lens, the image height on the image sensor, the F value, magnification, and focus position.

When the optical low-pass filter is not arranged, the low-pass filter effect can be obtained only by the pixel aperture and the imaging optical system, and the response becomes large even at a relatively high frequency such as a frequency $F_H$. It is known from the sampling theorem that the response at the frequency $F_H$ is folded back around the Nyquist frequency of 1 and is erroneously recognized as the response at a frequency $F_L$ as shown by a solid line 902. If signals in a frequency band around the frequency $F_L$ are extracted when calculating the phase difference for focus detection, the influence of the folded-back frequency of $F_H$ may lead to an error, and erroneous detection may be caused. Therefore, conventionally, an optical low-pass filter made of birefringent material is placed in front of the image sensor so as to reduce the response characteristics at frequencies higher than the Nyquist frequency as shown by a dashed line 903, thereby components higher than the Nyquist frequency that cause moiré in images and noise during focus detection are reduced.

Further, a minimum value at which the frequency component is cut to almost zero using the low-pass filter characteristics is called a trap point ($T_{p1}$ in FIG. 9). In optical low-pass filters made of birefringent materials, the low-pass filter characteristics vary depending on the components and thickness of the birefringent material, and generally the low-pass filters are designed such that a trap point is formed at a point higher than the Nyquist frequency to prevent aliasing signals.

On the other hand, many image stabilization techniques have been proposed in which the effects of shake on image capturing apparatuses, such as digital cameras, are corrected by moving the image sensor such as a CMOS sensor and/or some optical elements of the imaging optical system in a direction perpendicular to the optical axis. In addition, a technology has been disclosed for a vibration-type low-pass filter that utilizes the mechanism for the image stabilization techniques and obtains an effect equivalent to an optical low-pass filter by moving the sensor and/or the optical elements in a predetermined manner during image shooting (Japanese Patent Laid-Open No. 2021-071573).

In order to prevent aliasing signals, it is desirable to obtain low-pass filter characteristics in which, ideally, signals below the Nyquist frequency are not cut in order to maintain resolution, while frequency components higher than the Nyquist frequency are set to zero, as shown by a dash-dot line 904 in FIG. 9. However, in a conventional optical low-pass filter made of birefringent material that has a trap point between spatial frequencies 1 and 2, the response becomes as shown by the dashed line 903 as described above, and it is difficult to make frequency components higher than the Nyquist frequency approach zero.

On the other hand, Japanese Patent Laid-Open No. 2021-071573 discloses actuation control for obtaining the effect of a low-pass filter using a vibration-type low-pass filter, but there is no description regarding specific actuation control to achieve the effect of the low-pass filter that can reduce frequency components higher than the Nyquist frequency.

SUMMARY OF THE INVENTION

The present invention has been made in consideration of the above situation, and uses an image stabilization mechanism to achieve appropriate low-pass filter characteristics.

According to the present invention, provided is an image capturing apparatus comprising: an image sensor in which a plurality of pixels including focus detection pixels that output signals so as to be able to acquire a pair of focus detection signals having parallax based on light fluxes that have passed through mutually different pupil regions of an imaging optical system are arranged; a movement control unit that moves incident positions of the light fluxes on the image sensor; and a focus detection unit that performs phase difference focus detection using the pair of focus detection signals, wherein the movement control unit moves the incident positions in a first direction for detecting a phase difference a plurality of cycles during an exposure period for acquiring the pair of focus detection signals, and the plurality of cycles of movement includes movement with a first amplitude and movement with a second amplitude different from the first amplitude, and wherein the focus detection unit is implemented by one or more processors, circuitry or a combination thereof.

Further, according to the present invention, provided is an image capturing apparatus comprising: an image sensor in which a plurality of pixels including focus detection pixels that output signals so as to be able to acquire a pair of focus detection signals having parallax based on light fluxes that have passed through mutually different pupil regions of an imaging optical system are arranged; a movement control unit that moves incident positions of the light fluxes on the image sensor; and a focus detection unit that performs phase difference focus detection using the pair of focus detection signals, wherein the movement control unit moves the incident positions such that a distribution of speeds at positions to which the incident positions are moved in a first direction for detecting a phase difference during an exposure period for acquiring the pair of focus detection signals is a Gaussian distribution.

Furthermore, according to the present invention, provided is a control method of an image capturing apparatus which comprises: an image sensor in which a plurality of pixels including focus detection pixels that output signals so as to be able to acquire a pair of focus detection signals having parallax to be used for phase difference focus detection based on light fluxes that have passed through mutually different pupil regions of an imaging optical system are arranged; and a movement control unit that moves incident positions of the light fluxes on the image sensor, the method comprising moving the incident positions in a first direction for detecting a phase difference a plurality of cycles during an exposure period for acquiring the pair of focus detection signals, wherein the plurality of cycles of movement includes movement with a first amplitude and movement with a second amplitude different from the first amplitude.

Further, according to the present invention, provided is a control method of an image capturing apparatus which comprises: an image sensor in which a plurality of pixels including focus detection pixels that output signals so as to be able to acquire a pair of focus detection signals having parallax to be used for phase difference focus detection based on light fluxes that have passed through mutually different pupil regions of an imaging optical system are arranged; and a movement control unit that moves incident positions of the light fluxes on the image sensor, the method comprising moving the incident positions such that a distribution of speeds at positions to which the incident positions are moved in a first direction for detecting a phase difference during an exposure period for acquiring the pair of focus detection signals is a Gaussian distribution.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1B is a block diagram illustrating a schematic configuration of the image capturing apparatus according to the first embodiment;

FIG. 3A is a schematic diagram in a case where conventional control of an incident position of incident light using a vibration-type low-pass filter is applied to the present invention;

FIG. 3B is a schematic diagram for explaining the low-pass filter characteristics obtained by controlling the incident position as shown in FIG. 3A and problems thereof;

FIGS. 6A and 6B are schematic diagrams illustrating a periodic locus of incident light caused by the vibration-type low-pass filter according to a second embodiment;

DESCRIPTION OF THE EMBODIMENTS

Figure 1A:
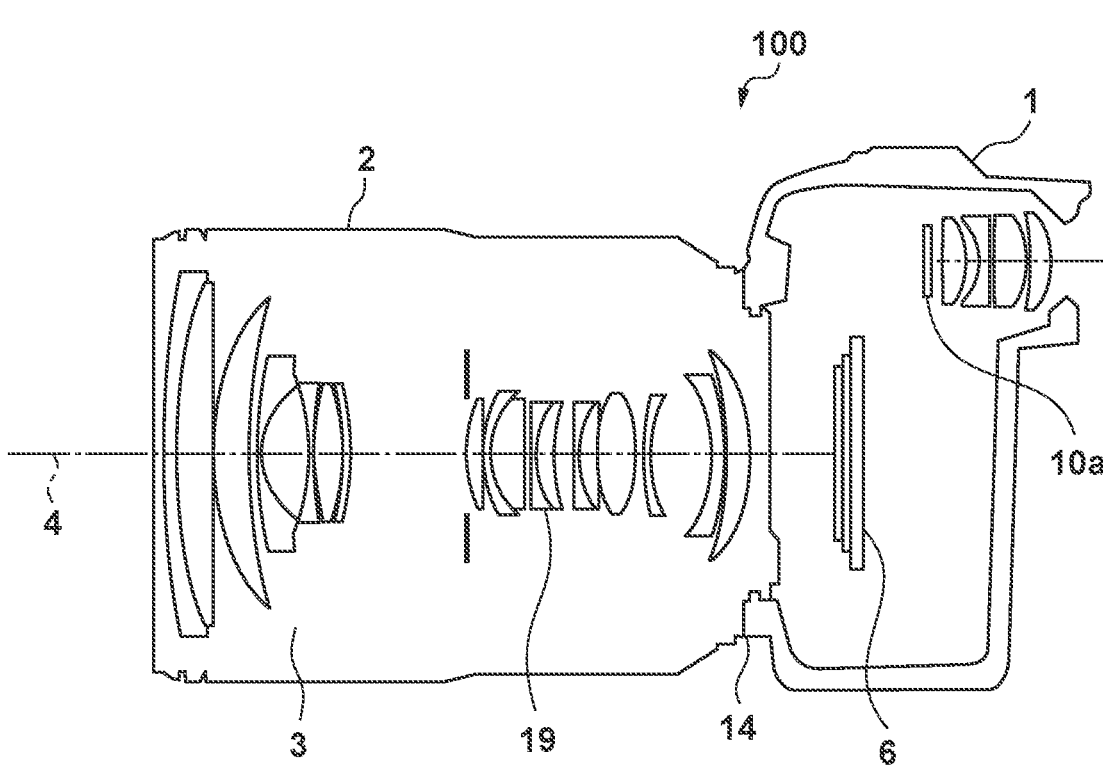
FIG. 1A is a central sectional view of an image capturing apparatus according to a first embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIGS. 1A and 1B are diagrams showing a configuration of an image capturing apparatus 100 according to a first embodiment of the present invention. FIG. 1A is a central sectional view of the image capturing apparatus 100, and FIG. 1B is a block diagram showing a schematic configuration of the image capturing apparatus 100.

As shown in FIG. 1A, the image capturing apparatus 100 of the present invention includes a camera body 1 and a lens unit 2 that can be attached to and detached from the camera body 1. The lens unit 2 has an imaging optical system 3 including a plurality of lenses including an image stabilization lens unit 19. A dotted line 4 indicates the optical axis of the imaging optical system 3. The camera body 1 also includes an image sensor 6 and an electronic viewfinder 10a that is also called an EVF and forms a part of a display device 10. The camera body 1 and the lens unit 2 are communicably connected via an electric contact 14.

FIG. 1B is the block diagram showing the schematic configuration of the image capturing apparatus 100. The image capturing apparatus 100 composed of the camera body 1 and the lens unit 2 is roughly divided into an imaging system, an image processing system, a recording/playback system, and a control system. The imaging system includes the imaging optical system 3 and the image sensor 6, and the image processing system includes an image processing unit 7 and a focus detection unit 11. The recording/playback system includes a memory 8 and the display device 10, and the control system includes a camera system control unit 5, a camera operation unit 9, the focus detection unit 11, a lens system control unit 15, a lens image stabilization unit 18, and a focus adjustment unit 22.

In addition to the configuration shown in FIG. 1A, the lens unit 2 further includes the lens system control unit 15, the lens image stabilization unit 18 that actuates the image stabilization lens unit 19 to compensate for shake, a lens shake detection unit 20, and the focus adjustment unit 22 for actuating the focus lens included in the imaging optical system 3.

In the present embodiment, the lens shake detection unit 20 uses a vibrating gyro that uses Coriolis force, and detects the rotational shake applied to the lens unit 2. The lens shake detection unit 20 detects the shake of the lens unit 2 (referred to as "lens shake", hereinafter) caused by the shake of the user's hand and outputs the lens shake detection signal indicating the lens shake to the lens system control unit 15. The lens system control unit 15 calculates a shift amount (correction amount) of the image stabilization lens unit 19 for reducing (cancelling) the image shake due to the lens shake by using the lens shake detection signal, and outputs an image stabilization instruction including the shift amount to the lens image stabilization unit 18. The lens image stabilization unit 18 controls the movement of the image stabilization lens unit 19 based on the image stabilization instruction from the lens system control unit 15. Specifically, the image stabilization lens unit 19 is actuated by the calculated shift amount by controlling an actuator included in a shift mechanism in accordance with the image stabilization instruction, whereby lens stabilization is performed.

In addition to the image stabilization control described above, the lens system control unit 15 can also actuate a focus lens included in the imaging optical system 3 via the focus adjustment unit 22 and control to actuate an aperture mechanism (not shown), zoom lens, and so forth. In addition to image stabilization control, the lens image stabilization unit 18 also can control to actuate the image stabilization lens unit 19 based on the control of lens system control unit 15 to reduce the effects of moiré caused by aliasing of high spatial frequency components of a subject. This realizes the function as a vibration-type low-pass filter in this embodiment. Note that details of the periodic actuation control in this embodiment will be described later.

In addition to the configuration shown in FIG. 1A, the camera body 1 further includes the camera system control unit 5, the image processing unit 7, the memory 8, the camera operation unit 9, the display device 10, the focus detection unit 11, a camera image stabilization unit 12, and a camera shake detection unit 13. The display device 10 also includes a rear display device (not shown) and a small display panel (not shown) provided on the upper surface of the camera body 1 for displaying shooting information in addition to the electronic viewfinder 10*a*.

Figure 2:
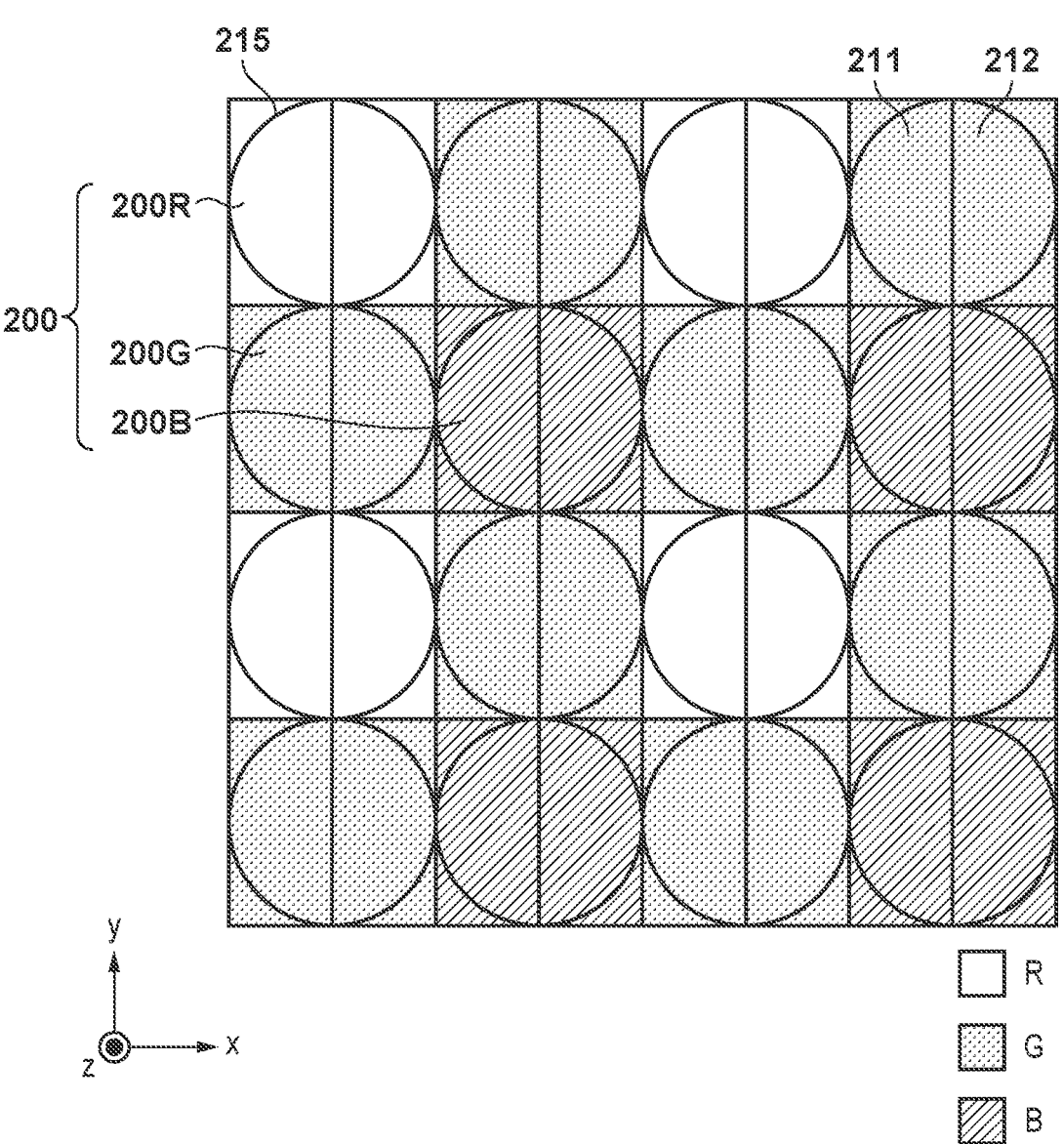
FIG. 2 is a plan view showing an example of an array of pixels according to the first embodiment.

FIG. 2 is a diagram showing an example of a pixel array of the image sensor 6 according to the present embodiment, and 4 columns×4 rows of imaging pixels in the pixel array of the two-dimensional CMOS sensor used as the image sensor 6 are shown.

In this embodiment, it is assumed that each pixel group 200 is composed of pixels of 2 columns×2 rows and is covered with the Bayer array color filter. In each pixel group 200, a pixel 200R having the spectral sensitivity of R (red) is arranged at the upper left position, pixels 200G having the spectral sensitivity of G (green) are arranged at the upper right and lower left positions, and a pixel 200B having the spectral sensitivity of B (blue) is arranged at the lower right position. Further, in the image sensor 6 of the present embodiment, each pixel has a plurality of photodiodes (photoelectric conversion units) with respect to one micro-lens 215 in order to perform on-imaging plane phase difference focus detection. In the present embodiment, it is assumed that each pixel is composed of two photodiodes 211 and 212 arranged in 2 columns×1 row. Hereinafter, a pixel having such a configuration is referred to as a "focus detection pixel".

The image sensor 6 can acquire an image signal and focus detection signals by arranging a large number of pixel groups 200 consisting of 2 columns×2 rows of focus detection pixels (4 columns×2 rows of photodiodes) shown in FIG. 2 on its imaging surface.

In each focus detection pixel having such a configuration, light fluxes that have passed through different pupil regions are separated by the microlens 215 and enter the photodiodes 211 and 212. Then, the signal (A+B signal) obtained by adding the signals from the two photodiodes 211 and 212 is used as an image signal, and the two signals (A signal and B signal) individually read out from the photodiodes 211 and 212 are used as a focus detection signal pair. It should be noted that the image signal and the focus detection signals may be read out respectively, but in consideration of the processing load, the following readout method may be performed. That is, the image signal (A+B signal) and the focus detection signal (for example, A signal) of one of the photodiodes 211 and 212 are read out, and the difference is taken to obtain the other focus detection signal (for example, B signal) having parallax.

Then, by collecting the plurality of A signals outputted from the plurality of pixels and the plurality of B signals, respectively, a pair of focusing signals (A focusing signal and B focusing signal) used in the on-imaging plane phase difference AF is obtained. Then, the pair of focusing signals are overlapped with each other while shifting the relative positions thereof, and at each shifted position, a correlation calculation of obtaining, for example, the area (correlation amount) of the difference portion of the waveforms is performed. The shifted position where this correlation amount is the smallest, that is, the phase difference (hereinafter referred to as "image shift amount") corresponding to the shift amount with which the correlation is the highest is obtained, and a defocus amount and the defocus direction of the imaging optical system is calculated from the calculated image shift amount.

By using the image sensor 6 having the structure as described above, it is possible to perform live view shooting by the image sensor 6 of receiving light and providing a subject image that can be observed in real time, as well as to perform phase difference focus detection without using a mechanism for splitting light from a subject.

In this embodiment, the explanation will be given based on the assumption that all pixels of the image sensor 6 are configured as focus detection pixels, the photodiodes 212 receive the luminous flux passing through the area approximately on the left half of the exit pupil, and the photodiodes 211 receive the luminous flux passing through the area approximately on the right half of the exit pupil. In this case, the distance between the adjacent photodiodes 211 and the distance between the adjacent photodiodes 212 in the dividing direction is equal to the distance between the adjacent focus detection pixels.

The image sensor 6 having the above configuration converts light from a subject incident through the imaging optical system 3 into an electric signal by photoelectric conversion and outputs the electric signal, which is input to the image processing unit 7.

The image processing unit 7 has an A/D converter, a white balance adjustment circuit, a gamma correction circuit, an interpolation calculation circuit, and the like inside, and can generate an image for recording. A color interpolation processing circuit is also provided in the image processing unit 7, and performs color interpolation (demosaicing) processing on Bayer arrayed signals to generate a color image. Further, the image processing unit 7 compresses images, moving images, sounds, etc. using predetermined methods. The image processing unit 7 performs not only such processing for image shooting but also so-called focus detection processing by processing pixel signals from the focus detection pixels in cooperation with the focus detection unit 11 during a period between shootings of images.

The focus detection unit 11 cooperates with the image processing unit 7 to detect the image shift amount between the optical images based on the output from the focus detection pixels included in the image sensor 6, and convert the image shift amount into a defocus amount by applying a known method. The camera system control unit 5 sends focus adjustment information to the lens system control unit 15 based on the defocus amount outputted from the focus detection unit 11, and the lens system control unit 15 actuates the focus lens in the direction of the optical axis 4 via the focus adjustment unit 22.

Further, the camera system control unit 5 obtains an appropriate exposure amount by performing a predetermined arithmetic computation using the image data obtained by the image processing unit 7, and controls the aperture included in the imaging optical system 3 and the exposure period of the image sensor 6 based on the exposure amount.

By appropriately adjusting the imaging optical system 3, the image sensor 6 is exposed with an appropriate amount of light from the subject, and the subject image is formed in the vicinity of the image sensor 6.

In the present embodiment, the camera shake detection unit 13 uses a vibrating gyro that utilizes the Coriolis force, and detects rotational shake applied to the camera body 1. The camera shake detection unit 13 detects a shake of the camera body 1 (hereinafter, referred to as "camera shake") caused by a user's hand shake or the like, and outputs a camera shake detection signal indicating the camera shake to the camera system control unit 5. The camera system control unit 5 calculates a shift amount (correction amount) of the image sensor 6 for reducing (cancelling) image blur due to the camera shake using the camera shake detection signal, and issues an image stabilization instruction including the shift amount to the camera image stabilization unit 12. The camera image stabilization unit 12 controls an actuator included in the shift mechanism in accordance with the image stabilization instruction from the camera system control unit 5 to shift the image sensor 6 by the shift amount in the plane orthogonal to the optical axis 4. As a result, sensor image stabilization is performed.

Further, in addition to the image stabilization control, the camera image stabilization unit 12 performs periodic actuation control on the image sensor 6 so as to reduce the influence of moiré caused by the spatial aliasing of the high spatial frequency components of the subject image under control of the camera system control unit 5. This realizes the function as a vibration-type low-pass filter in the present embodiment. Note that details of the actuation control in this embodiment will be described later.

Here, the effects and problems of a low-pass filter realized by applying the periodic actuation control of the conventional vibration-type low-pass filter described in Japanese Patent Laid-Open No. 2021-071573 will be described. Note that the vibration-type low-pass filter is realized in such a manner that the camera image stabilization unit 12 and/or the lens image stabilization unit 18 moves at least one of the image sensor 6 and the image stabilization lens unit 19 in a direction perpendicular to the optical axis so that the position of the light incident on the image sensor 6 is shifted. Therefore, in the following description, the image sensor 6, the image stabilization lens unit 19, and the combination of the image sensor 6 and the image stabilization lens unit 19 are collectively referred to as a "shake correction member."

FIG. 3A is a schematic diagram showing a periodic locus of the incident light caused by the shake correction member, and FIG. 3B is the response characteristic (low-pass filter characteristic) as a vibration-type low-pass filter corresponding to the periodic locus of the incident light shown in FIG. 3A and its problems. The upper part of FIG. 3A shows a part of the R (red) and G (green) row of the Bayer array among the pixels that constitute the image sensor 6. The area corresponding to the photodiode on the left side of the pixel is conveniently referred to as an A area, the area corresponding to the photodiode on the right side of the pixel is conveniently referred to as a B area, and the A areas of the R pixels and G pixels are labelled RA and GA, respectively, and the B areas of the R pixels and G pixels are labelled RB and GB, respectively.

The lower part of FIG. 3A shows the change in the position (incidence position) of the incident light on the GA pixel indicated by ▼ at time t=0 with respect to time, and the vertical axis represents the passage of time downward, and the horizontal axis indicates the position in the horizontal direction. A period $T_{AF}$ corresponding to two scales of the dotted lines in the time direction indicates the vertical synchronization period, that is, the exposure period during focus detection or the exposure period during shooting, and the focus detection process is performed once in an integer-multiple of this exposure period $T_{AF}$. Further, the position corresponding to one scale of the dotted line in the position direction represents a distance $d_{AF}$ between focus detection pixels. That is, the amplitude of the periodic locus of the incident light shown in FIG. 3A is ½ of the distance $d_{AF}$ between the focus detection pixels. The periodic locus of the incident light shown in FIG. 3A can be realized by periodical actuation control of the shake correction member in the horizontal direction.

In recent years, the frame rate during image shooting and focus detection has been significantly increased, and as a result, the exposure period $T_{AF}$ has become extremely short. On the other hand, in order to achieve low-pass filter characteristics that can reduce frequency components above the trap point by periodically driving the shake correction member, it is desirable to shift the position of the incident light for one cycle or more during the exposure period $T_{AF}$, as shown in FIG. 3A. Conversely, if the set exposure time is long, there is no need to increase the actuation frequency of the shake correction member in order to suppress power consumption. Therefore, the actuation frequency of the shake correction member may be changed according to the exposure period so that the position of the incident light is shifted by one cycle or more during the exposure period $T_{AF}$.

Figure 9:
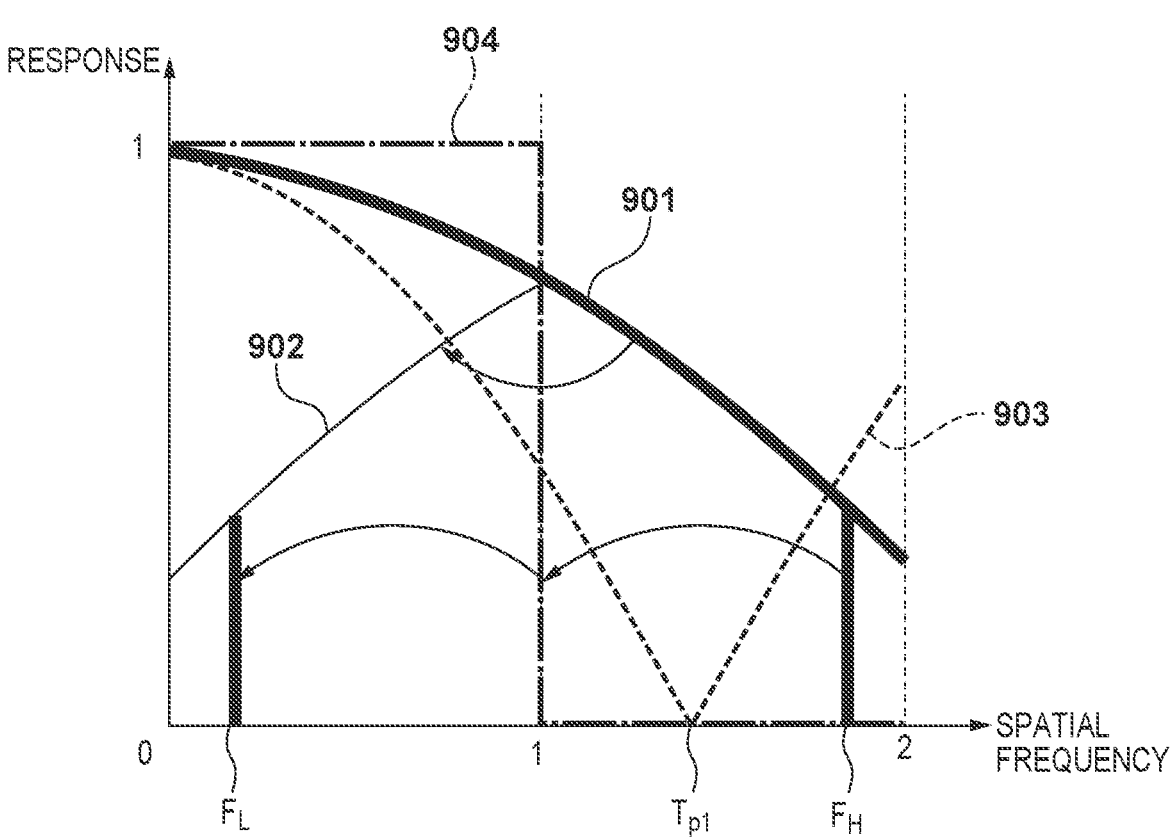
FIG. 9 is a schematic diagram showing response characteristics of a conventional optical system with respect to spatial frequency.

FIG. 3B shows the theoretical low-pass filter characteristics in this case. In FIG. 3A, the shake correction member is actuated so that the periodic locus of the incident light has an amplitude ($d_{AF}/2$) equivalent to ½ pixel pitch of the image sensor 6, so the obtained low-pass filter characteristics are as shown in FIG. 3B that is close to the characteristics with the trap point (Tp1) formed at the Nyquist frequency. As explained with reference to FIG. 9, the detection frequency for focus detection is often set in a relatively low frequency range, such as the frequency $F_L$. Therefore, the frequency component of frequency $F_H$ appears as aliasing noise. Therefore, with the low-pass filter characteristics shown in FIG. 3B, it is not possible to obtain the effect of reducing aliasing noise during focus detection.

Next, another periodic moving control of the incident position of incident light performed by actuating the shake correction member and the resulting low-pass filter characteristics will be described using FIGS. 4A and 4B.

Figure 4A:
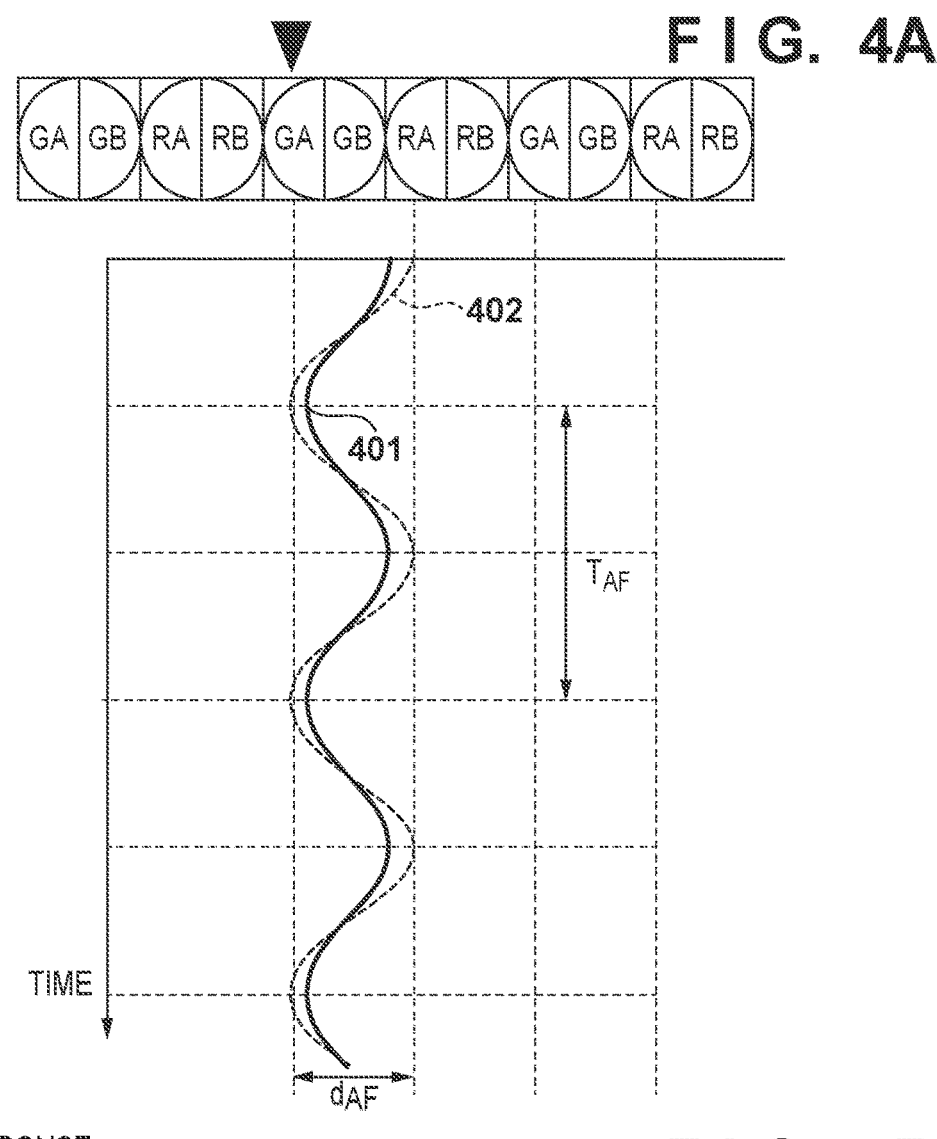
FIG. 4A is a schematic diagram illustrating periodic loci of incident light caused by a vibration-type low-pass filter according to the first embodiment.

In FIG. 4A, a dotted line 402 indicates a periodic locus of incident light with the same amplitude ($d_{AF}/2$) as in FIG. 3A, and a solid line 401 indicates a periodic locus of incident light with an amplitude of ⅓ of the distance $d_{AF}$ between the focus detection pixels.

Figure 4B:
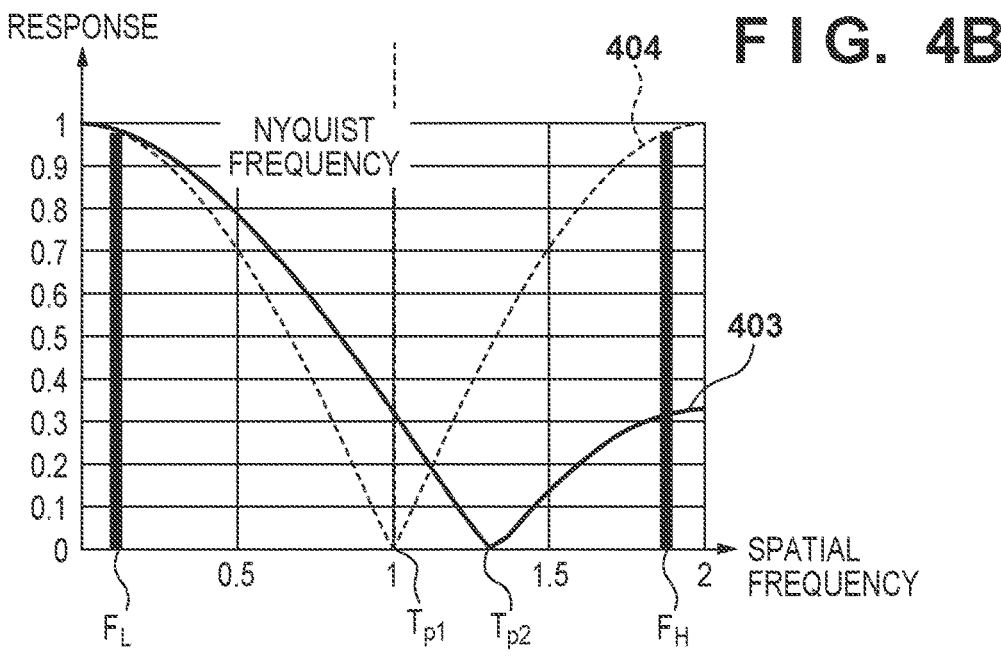
FIG. 4B is a schematic diagram for explaining the low-pass filter characteristics obtained by the periodic loci of the incident light shown in FIG. 4A.

As described above with reference to FIG. 3B, if the shake correction member is actuated so that the periodic locus 402 having the amplitude of ½ of the distance $d_{AF}$ between the focus detection pixels is obtained, the low-pass filter characteristics as shown by a dotted line 404 in FIG. 4B are obtained. On the other hand, the low-pass filter characteristics obtained by actuating the shake correction member such that the periodic locus 401 having an amplitude of ⅓ of the distance $d_{AF}$ between the focus detection pixels is obtained are as shown by a solid line 403 in FIG. 4B, and form a trap point ($T_{p2}$) at a frequency higher than the Nyquist frequency. By obtaining the low-pass filter characteristics as shown by the solid line 403, the absolute amount of aliasing noise at the frequency $F_H$ can be reduced more than the low-pass filter characteristics shown by the dotted line 404.

In addition, in the above example, a case has been described in which the shake correction member is controlled so that the amplitude of the periodic locus of the incident light becomes ⅓ of the distance $d_{AF}$ between the focus detection pixels, but the present invention is not limited to this. Generally, the smaller the amplitude, the smaller the effect of the obtained low-pass filter, so the trap point is formed on the higher frequency side. Therefore, by making the amplitude smaller than ½ of the distance between the focus detection pixels, the absolute amount of aliasing noise at frequency $F_H$ can be reduced more efficiently than in a case where the amplitude is ½ of the distance between the focus detection pixels. In this way, in the vibration-type low-pass filter that actuates the shake correction member, arbitrary low-pass filter characteristics can be designed by changing the amplitude of the periodic locus of the incident light that enters the image sensor 6.

A method for obtaining more effective low-pass filter characteristics will be described in consideration of the above-mentioned characteristics.

Figure 5A:
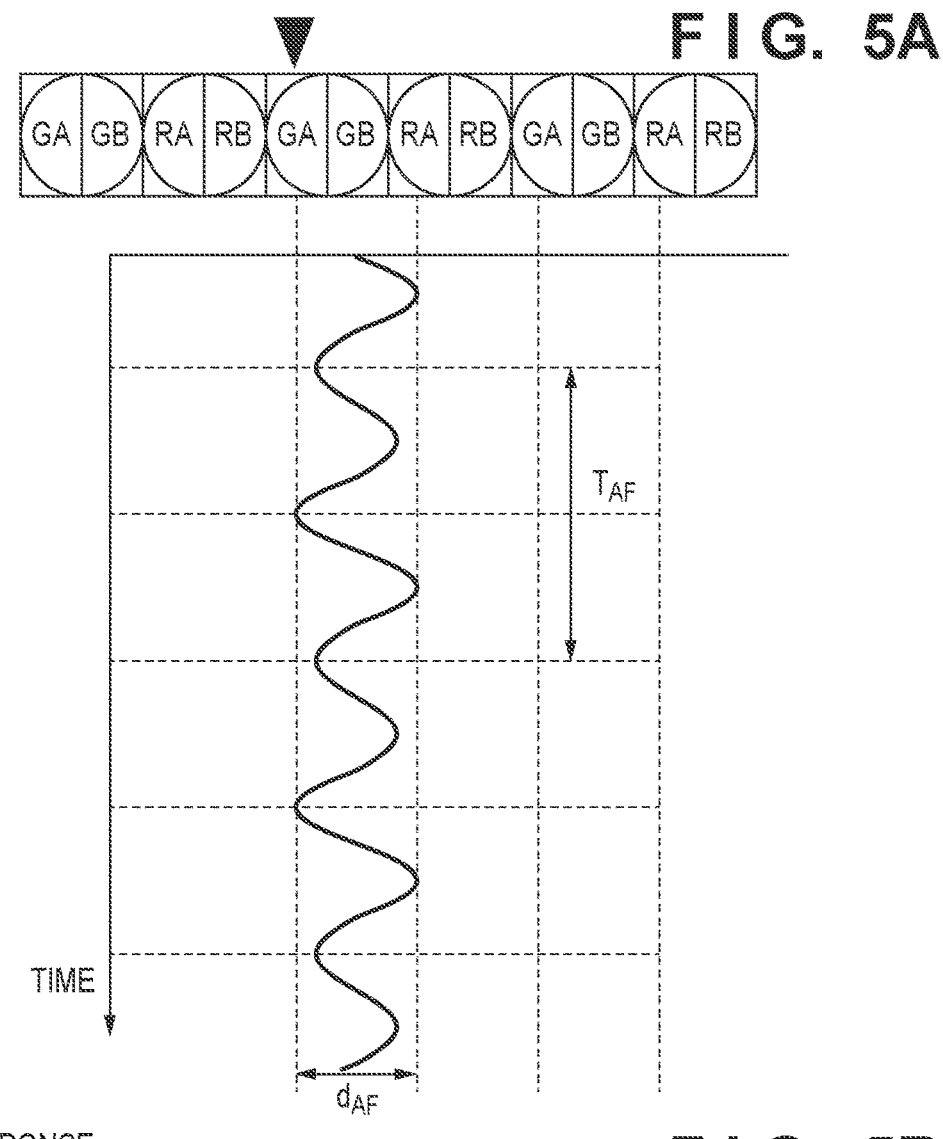
FIG. 5A is a schematic diagram illustrating a periodic locus of incident light caused by the vibration-type low-pass filter according to the first embodiment.
Figure 5B:
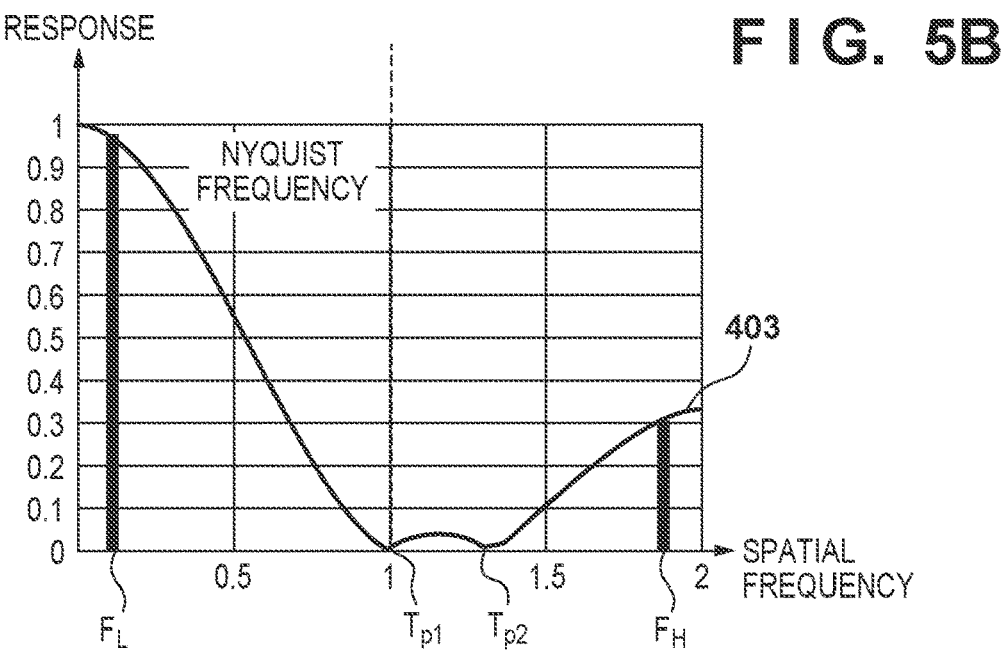
FIG. 5B is a schematic diagram for explaining the low-pass filter characteristics obtained by the periodic locus of the incident light shown in FIG. 5A.

FIG. 5A is a schematic diagram illustrating a periodic locus of incident light caused by the vibration-type low-pass filter in this embodiment, and FIG. 5B is a diagram for explaining the obtained low-pass filter characteristics.

FIG. 5A shows a periodic locus in a case where the incident position of the incident light is moved for one cycle with the amplitude shown in FIG. 3A and for one cycle with the amplitude shown in FIG. 4A during one exposure period $T_{AF}$. In other words, the actuation control of the shake correction member with the amplitude of the periodic locus of the incident light being ½ of the distance $d_{AF}$ between the focus detection pixels, and the actuation control of the shake correction member with the amplitude of the periodic locus of the incident light being ⅓ of the distance $d_{AF}$ of the focus detection pixels are performed during the exposure period $T_{AF}$.

By controlling the shake correction member in this way, the obtained low-pass filter characteristics become as shown in FIG. 5B, and both the trap point $T_{p1}$ and the trap point $T_{p2}$ are formed. That is, the low-pass filter characteristics obtained here are the product of the low-pass filter characteristic shown by the solid line 403 and the dotted line 404 in FIG. 4B. Therefore, it is possible to more effectively reduce the absolute amount of aliasing noise at frequency $F_H$ than the low-pass filter characteristics shown in FIG. 3B, which are obtained when the shake correction member is actuated to form the periodic locus shown in FIG. 3A. Further, it is possible to more effectively suppress signals exceeding the Nyquist frequency that produce moiré signals in images, other than the aliasing noise corresponding to frequency $F_H$ during focus detection.

In the example shown in FIGS. 5A and 5B, it is described a case in which the shake correction member is actuated so that the periodic locus of the incident light has two kinds of amplitudes, i.e., ½ and ⅓ of the distance $d_{AF}$ between the focus detection pixels. However, the present invention is not limited to this, and the amplitudes may be controlled so that the low-pass filter characteristic corresponding to at least one amplitude has a trap point at a frequency that is greater than the Nyquist frequency and less than twice the Nyquist frequency. In other words, the amplitude may be smaller than ½ of the distance $d_{AF}$ between the focus detection pixels. However, the smaller the amplitude is, the smaller the obtained low-pass effect becomes, so as an example, the amplitude may be smaller than ½ of the distance $d_{AF}$ between the focus detection pixels and larger than ¼ of the distance $d_{AF}$. Although it is preferable to cut the passing frequency component to zero at the trap point, in reality, it may not be possible to cut it to zero due to the influence of actuation error of the shake correction member. Therefore, it is sufficient that the low-pass filter characteristics have a minimum value at a frequency that is greater than the Nyquist frequency and less than twice the Nyquist frequency.

Further, the shake correction member may be actuated so that the periodic locus of the incident light is formed with a combination of periodic loci having at least two types of amplitudes, respectively, in one exposure period $T_{AF}$, and three or more types of amplitudes are acceptable.

In addition, for the plurality of amplitudes, with respect to a reference first amplitude, which is smaller than ½ of the distance $d_{AF}$ between the focus detection pixels, other amplitudes should not be an integer multiple of the first amplitude, which makes it possible to avoid trap points formed at the same frequency. Thereby, high frequencies higher than the Nyquist frequency can be cut more effectively. For example, in a case where the incident position of the incident light is moved so as to have a periodic locus of three or more cycles during one exposure period $T_{AF}$, it is conceivable to set a first amplitude and a second amplitude different from the first amplitude, and then gradually change the amplitude from the first amplitude to the second amplitude.

In addition, aliasing noise can be suppressed more effectively by synthesizing periodic loci of incident light with various amplitudes, but for the purpose of preserving the sense of image resolution and the focus detection signals, in general, it is better not to reduce positive signals (signals with frequencies below the Nyquist frequency) too much.

Further, during focus detection, it is sufficient if the detection frequency $F_L$ remains, but during image recording, the entire positive signal (signal below the Nyquist frequency) is required in order to keep good image resolution. Therefore, the amplitude of the periodic locus of the incident light may be controlled so that different low-pass filter characteristics will be obtained during focus detection and during image recording.

As described above, according to the first embodiment, more effective low-pass filter characteristics can be obtained by actuating the shake correction member so that the periodic locus of the incident light has a plurality of different amplitudes during each exposure period.

Second Embodiment

Next, a second embodiment of the present invention will be described. In the second embodiment, another example of periodic moving control of incident light using a vibration-type low-pass filter will be described. Note that an image capturing apparatus in the second embodiment is the same as that described in the first embodiment with reference to FIGS. 1A, 1B, and 2, and therefore a description thereof will be omitted.

Figure 7:
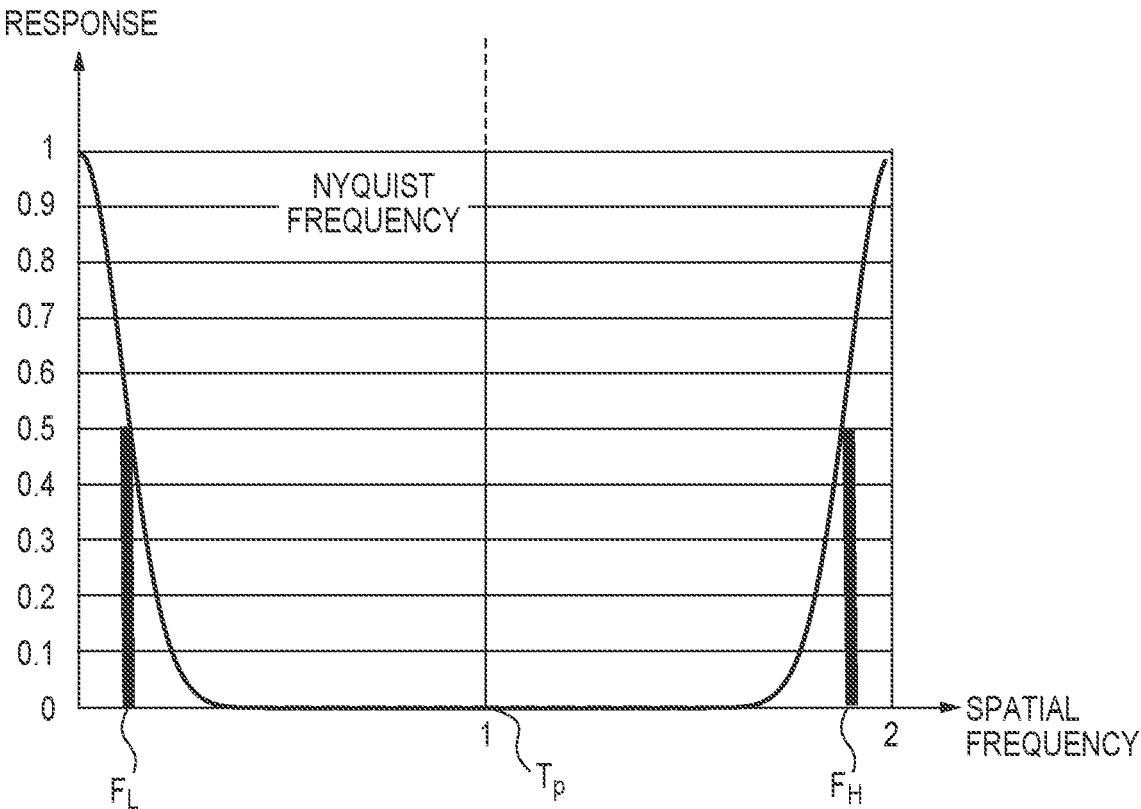
FIG. 7 is a schematic diagram for explaining the low-pass filter characteristics obtained by the periodic locus of the incident light caused by the vibration-type low-pass filter shown in FIG. 6A.

FIGS. 6A and 6B are schematic diagrams illustrating a periodic locus of incident light using a vibration-type low-pass filter in the second embodiment, and FIG. 7 is a diagram for explaining the obtained low-pass filter characteristics.

FIG. 6A shows the periodic locus of incident light in the second embodiment by a solid line. The points indicate position coordinates under actuation control at each time. Assuming that the initial position is x=0, the shake correction member is actuated so that the periodic locus of the incident light has an amplitude of ½ of the distance $d_{AF}$ between the focus detection pixels, as in FIG. 3A. However, in FIGS. 6A and FIG. 6B, by changing the moving speed of the incident light at each time, as shown in FIG. 6A, the speed at which the incident light passes through each position of the distance $d_{AF}$ of the focus detection pixels is made not being constant. Here, the incident light moves slowly at a position close to x=0, and moves quickly at a position close to x==$d_{AF}$/2.

FIG. 6B is a result of integrating the locus in the time direction of FIG. 6A, with the horizontal axis representing x and the vertical axis representing the probability of existence at each position. In this way, by changing the moving speed of the incident position of the incident light at each time, it is possible to control the movement of the incident position that exhibits a Gaussian distribution. The low-pass filter characteristics obtained at this time are as shown in FIG. 7. Since the moving control of the incident light generated in a form of Gaussian distribution takes a Gaussian distribution shape even after Fourier transformation, it is possible to obtain a low-pass filter characteristics with almost zero output around the Nyquist frequency as shown in FIG. 7.

Furthermore, as explained in the first embodiment, it is also possible to weaken the effect of the low-pass filter characteristics by reducing the amplitude, or to further reduce the aliasing noise at frequency $F_H$ by combining multiple amplitudes.

Note that the moving speed shown in FIG. 6A may be changed continuously or discontinuously.

As described above, according to the second embodiment, it is possible to suppress the occurrence of aliasing noise during focus detection and occurrence of moiré in images.

Modification

Figure 8A:
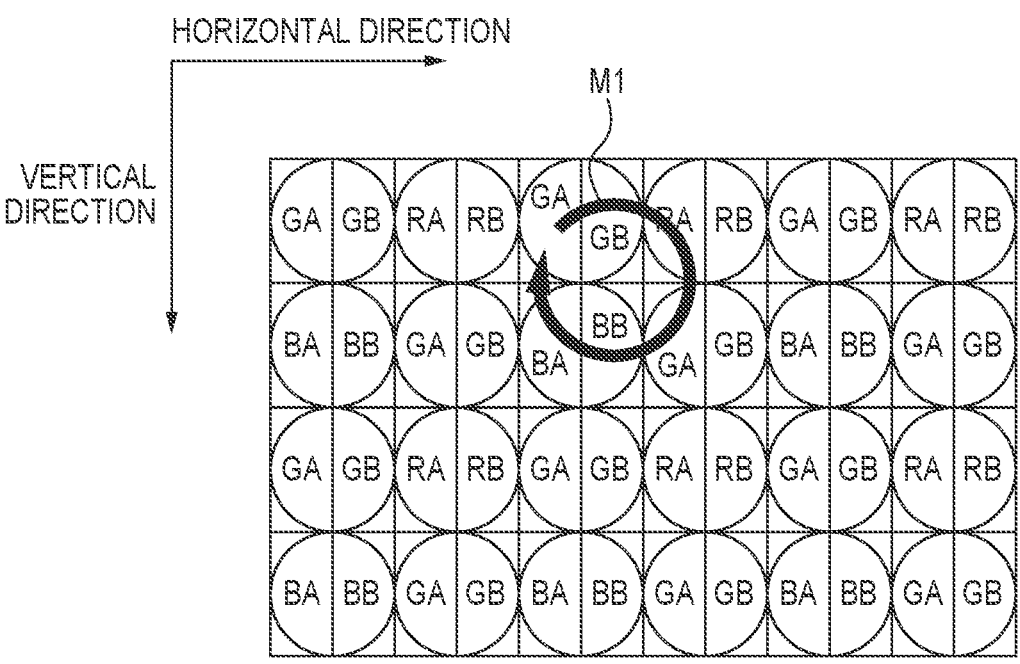
FIGS. 8A and 8B are schematic diagrams illustrating periodic loci of incident light caused by the vibration-type low-pass filter according to a modification.
Figure 8B:
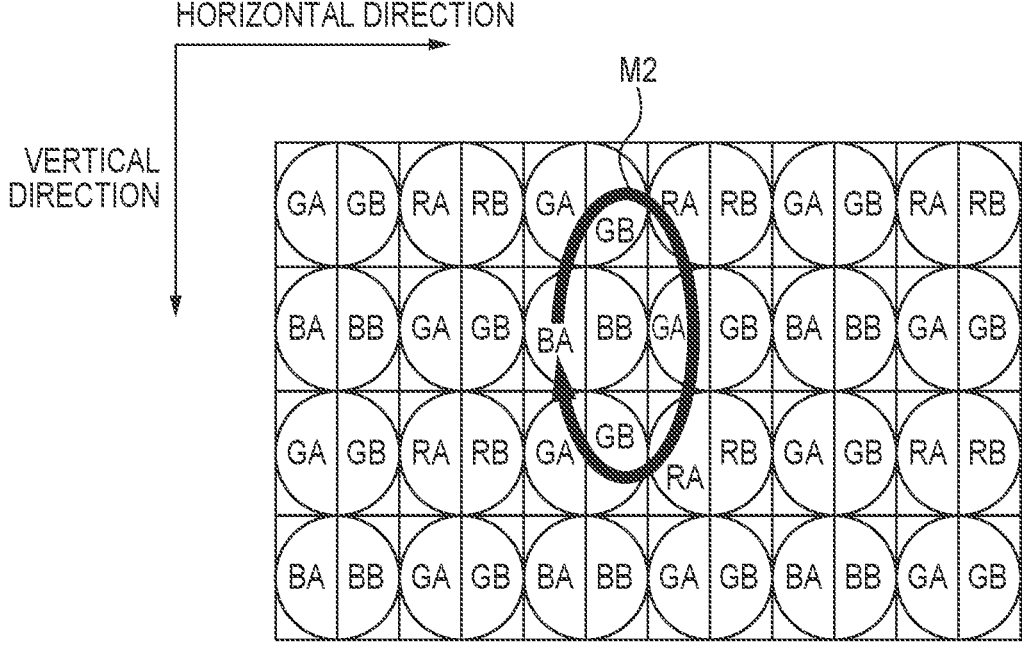

In the first and second embodiments described above, an actuation method is shown in which the moving direction of the incident light is the horizontal direction (pupil division direction for focus detection) shown in FIG. 2. However, the image sensor 6 extends both in the horizontal and vertical directions, and moiré in the image occurs both horizontally and vertically; therefore, when recording an image, the position of incident light may be moved in circular motion as shown by an arrow M1 in FIG. 8A. Furthermore, color moiré occurs depending on the cycle of the color filter of the image sensor 6. Therefore, as shown in FIG. 8B, the amplitudes of the circular motion may be differed in the horizontal direction and the vertical direction, as shown by an arrow M2.

Further, in FIG. 2, a case has been described in which the photodiodes 211 and 212 are arranged in the row direction (horizontal direction) in the focus detection pixels, but they may be arranged in the column direction (vertical direction). In that case, the direction of periodic actuation control may be the column direction. In addition, if four photodiodes are formed by dividing each focus detection pixel both in the horizontal and vertical directions, periodic actuation control may be performed in the exit pupil division direction corresponding to the combination of signals used for focus detection output from the photodiodes.

Further, in the embodiment described above, all the imaging pixels are formed as focus detection pixels, but the present invention is not limited to this, and the focus detection pixels may be arranged discretely. In this case, the periodic actuation control described above may be performed when acquiring the signal for focus detection.

Furthermore, in the above-described embodiments, explanations have been made using a digital camera with an interchangeable lens (so-called single-lens reflex camera), but the present invention is not limited to this, and the present invention may be applied to a digital camera with a fixed lens (so-called compact digital camera). Furthermore, although there is no particular mention of whether the focus detection operation is for a still image or a moving image, the present invention is not limited by the type of image to be shot.

Other Embodiments

Note that the present invention may be applied to a system made up of a plurality of devices, or to a device made up of one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-044724, filed Mar. 20, 2023 which is hereby incorporated by reference herein in its entirety.

What is claimed is:

1. An image capturing apparatus comprising:
an image sensor in which a plurality of pixels including focus detection pixels that output signals so as to be able to acquire a pair of focus detection signals having parallax based on light fluxes that have passed through mutually different pupil regions of an imaging optical system are arranged;
a movement control unit that moves incident positions of the light fluxes on the image sensor; and
a focus detection unit that performs phase difference focus detection using the pair of focus detection signals,
wherein the movement control unit moves the incident positions in a first direction for detecting a phase difference a plurality of cycles during an exposure period for acquiring the pair of focus detection signals, and the plurality of cycles of movement includes movement with a first amplitude and movement with a second amplitude different from the first amplitude,
wherein response characteristics of an effect of a vibration-type low-pass filter obtained by the movement with the first amplitude has a minimum value at a frequency that is larger than a Nyquist frequency based on a distance between the focus detection pixels and smaller than twice the Nyquist frequency, and
wherein the focus detection unit is implemented by one or more processors, circuitry or a combination thereof.

2. The image capturing apparatus according to claim 1, wherein the second amplitude is other than integral multiples of the first amplitude.

3. The image capturing apparatus according to claim 1, wherein the movement control unit moves at least one of the image sensor and an image stabilization lens included in the imaging optical system on a plane perpendicular to an optical axis of the imaging optical system.

4. An image capturing apparatus comprising:
an image sensor in which a plurality of pixels including focus detection pixels that output signals so as to be able to acquire a pair of focus detection signals having parallax based on light fluxes that have passed through mutually different pupil regions of an imaging optical system are arranged;
a movement control unit that moves incident positions of the light fluxes on the image sensor; and
a focus detection unit that performs phase difference focus detection using the pair of focus detection signals,
wherein the movement control unit moves the incident positions in a first direction for detecting a phase difference a plurality of cycles during an exposure period for acquiring the pair of focus detection signals, and the plurality of cycles of movement includes movement with a first amplitude and movement with a second amplitude different from the first amplitude, wherein the first amplitude is smaller than ½ of a distance between the plurality of pixels and larger than ¼ of the distance between the plurality of pixels, and
wherein the focus detection unit is implemented by one or more processors, circuitry or a combination thereof.

5. The image capturing apparatus according to claim 4, wherein the first amplitude is ⅓ of the distance between the plurality of pixels.

6. An image capturing apparatus, comprising:
an image sensor in which a plurality of pixels including focus detection pixels that output signals so as to be able to acquire a pair of focus detection signals having parallax based on light fluxes that have passed through mutually different pupil regions of an imaging optical system are arranged;
a movement control unit that moves incident positions of the light fluxes on the image sensor; and
a focus detection unit that performs phase difference focus detection using the pair of focus detection signals,
wherein the movement control unit moves the incident positions in a first direction for detecting a phase difference a plurality of cycles during an exposure period for acquiring the pair of focus detection signals, and the plurality of cycles of movement includes movement with a first amplitude and movement with a second amplitude different from the first amplitude,
wherein the plurality of cycles of movement includes movement in which a distribution of positions to which the incident positions are moved is a Gaussian distribution, and
wherein the focus detection unit is implemented by one or more processors, circuitry or a combination thereof.

7. The image capturing apparatus according to claim 6, wherein the movement control unit continuously changes speed at which the incident positions move.

8. The image capturing apparatus according to claim 6, wherein the movement control unit discontinuously changes speed at which the incident positions move.

9. An image capturing apparatus comprising:
an image sensor in which a plurality of pixels including focus detection pixels that output signals so as to be able to acquire a pair of focus detection signals having parallax based on light fluxes that have passed through mutually different pupil regions of an imaging optical system are arranged;
a movement control unit that moves incident positions of the light fluxes on the image sensor; and
a focus detection unit that performs phase difference focus detection using the pair of focus detection signals,
wherein the movement control unit moves the incident positions in a first direction for detecting a phase difference a plurality of cycles during an exposure period for acquiring the pair of focus detection signals, and the plurality of cycles of movement includes movement with a first amplitude and movement with a second amplitude different from the first amplitude,
wherein the movement control unit moves the incident positions using different methods during an exposure period of the image sensor for acquiring a recording signal and during an exposure period of the image sensor for acquiring the pair of focus detection signals,
wherein the movement control unit controls the amplitude of the movement in a case of acquiring the pair of focus detection signals smaller than the amplitude of the movement in a case of acquiring the recording signal, and wherein the focus detection unit is implemented by one or more processors, circuitry or a combination thereof.

10. The image capturing apparatus according to claim 9, wherein the movement control unit moves the incident positions in the first direction and in a second direction orthogonal to the first direction during the exposure period for acquiring the recording signal.

11. An image capturing apparatus comprising:

an image sensor in which a plurality of pixels including focus detection pixels that output signals so as to be able to acquire a pair of focus detection signals having parallax based on light fluxes that have passed through mutually different pupil regions of an imaging optical system are arranged;

a movement control unit that moves incident positions of the light fluxes on the image sensor; and a focus detection unit that performs phase difference focus detection using the pair of focus detection signals, wherein the movement control unit moves the incident positions such that a distribution of speeds at positions to which the incident positions are moved in a first direction for detecting a phase difference during an exposure period for acquiring the pair of focus detection signals is a Gaussian distribution.

12. A control method of an image capturing apparatus which comprises: an image sensor in which a plurality of pixels including focus detection pixels that output signals so as to be able to acquire a pair of focus detection signals having parallax to be used for phase difference focus detection based on light fluxes that have passed through mutually different pupil regions of an imaging optical system are arranged; and a movement control unit that moves incident positions of the light fluxes on the image sensor, the method comprising moving the incident positions in a first direction for detecting a phase difference a plurality of cycles during an exposure period for acquiring the pair of focus detection signals, wherein the plurality of cycles of movement includes movement with a first amplitude and movement with a second amplitude different from the first amplitude, and wherein response characteristics of an effect of a vibration-type low-pass filter obtained by the movement with the first amplitude has a minimum value at a frequency that is larger than a Nyquist frequency based on a distance between the focus detection pixels and smaller than twice the Nyquist frequency.

13. A control method of an image capturing apparatus which comprises: an image sensor in which a plurality of pixels including focus detection pixels that output signals so as to be able to acquire a pair of focus detection signals having parallax to be used for phase difference focus detection based on light fluxes that have passed through mutually different pupil regions of an imaging optical system are arranged; and a movement control unit that moves incident positions of the light fluxes on the image sensor, the method comprising moving the incident positions such that a distribution of speeds at positions to which the incident positions are moved in a first direction for detecting a phase difference during an exposure period for acquiring the pair of focus detection signals is a Gaussian distribution.

14. A control method of an image capturing apparatus which comprises: an image sensor in which a plurality of pixels including focus detection pixels that output signals so as to be able to acquire a pair of focus detection signals having parallax to be used for phase difference focus detection based on light fluxes that have passed through mutually different pupil regions of an imaging optical system are arranged; and a movement control unit that moves incident positions of the light fluxes on the image sensor, the method comprising:

moving the incident positions in a first direction for detecting a phase difference a plurality of cycles during an exposure period for acquiring the pair of focus detection signals, wherein the plurality of cycles of movement includes movement with a first amplitude and movement with a second amplitude different from the first amplitude, and wherein the first amplitude is smaller than ½ of a distance between the plurality of pixels and larger than ¼ of the distance between the plurality of pixels.

15. A control method of an image capturing apparatus which comprises: an image sensor in which a plurality of pixels including focus detection pixels that output signals so as to be able to acquire a pair of focus detection signals having parallax to be used for phase difference focus detection based on light fluxes that have passed through mutually different pupil regions of an imaging optical system are arranged; and a movement control unit that moves incident positions of the light fluxes on the image sensor, the method comprising moving the incident positions in a first direction for detecting a phase difference a plurality of cycles during an exposure period for acquiring the pair of focus detection signals, wherein the plurality of cycles of movement includes movement with a first amplitude and movement with a second amplitude different from the first amplitude, and wherein the plurality of cycles of movement includes movement in which a distribution of positions to which the incident positions are moved is a Gaussian distribution.

16. A control method of an image capturing apparatus which comprises: an image sensor in which a plurality of pixels including focus detection pixels that output signals so as to be able to acquire a pair of focus detection signals having parallax to be used for phase difference focus detection based on light fluxes that have passed through mutually different pupil regions of an imaging optical system are arranged; and a movement control unit that moves incident positions of the light fluxes on the image sensor, the method comprising moving the incident positions in a first direction for detecting a phase difference a plurality of cycles during an exposure period for acquiring the pair of focus detection signals, wherein the plurality of cycles of movement includes movement with a first amplitude and movement with a second amplitude different from the first amplitude, wherein the incident positions are moved using different methods during an exposure period of the image sensor for acquiring a recording signal and during an exposure period of the image sensor for acquiring the pair of focus detection signals, and wherein the amplitude of the movement in a case of acquiring the pair of focus detection signals is controlled smaller than the amplitude of the movement in a case of acquiring the recording signal.

* * * * *